(No Model.) 7 Sheets—Sheet 1.
L. C. EVANS.
POTATO PLANTER.

No. 545,786. Patented Sept. 3, 1895.

WITNESSES: INVENTOR
Louis C. Evans
BY
ATTORNEY (No Model.) 7 Sheets—Sheet 2.
L. C. EVANS.
POTATO PLANTER.

No. 545,786. Patented Sept. 3, 1895.

WITNESSES:
Frank M Burnham
Chas. J. Welch

INVENTOR
Louis C. Evans
BY
ATTORNEY (No Model.) 7 Sheets—Sheet 3.

L. C. EVANS.
POTATO PLANTER.

No. 545,786. Patented Sept. 3, 1895.

WITNESSES:
Frank M. Burnham
Chas. I. Welsh

INVENTOR
Louis C. Evans
BY
ATTORNEY

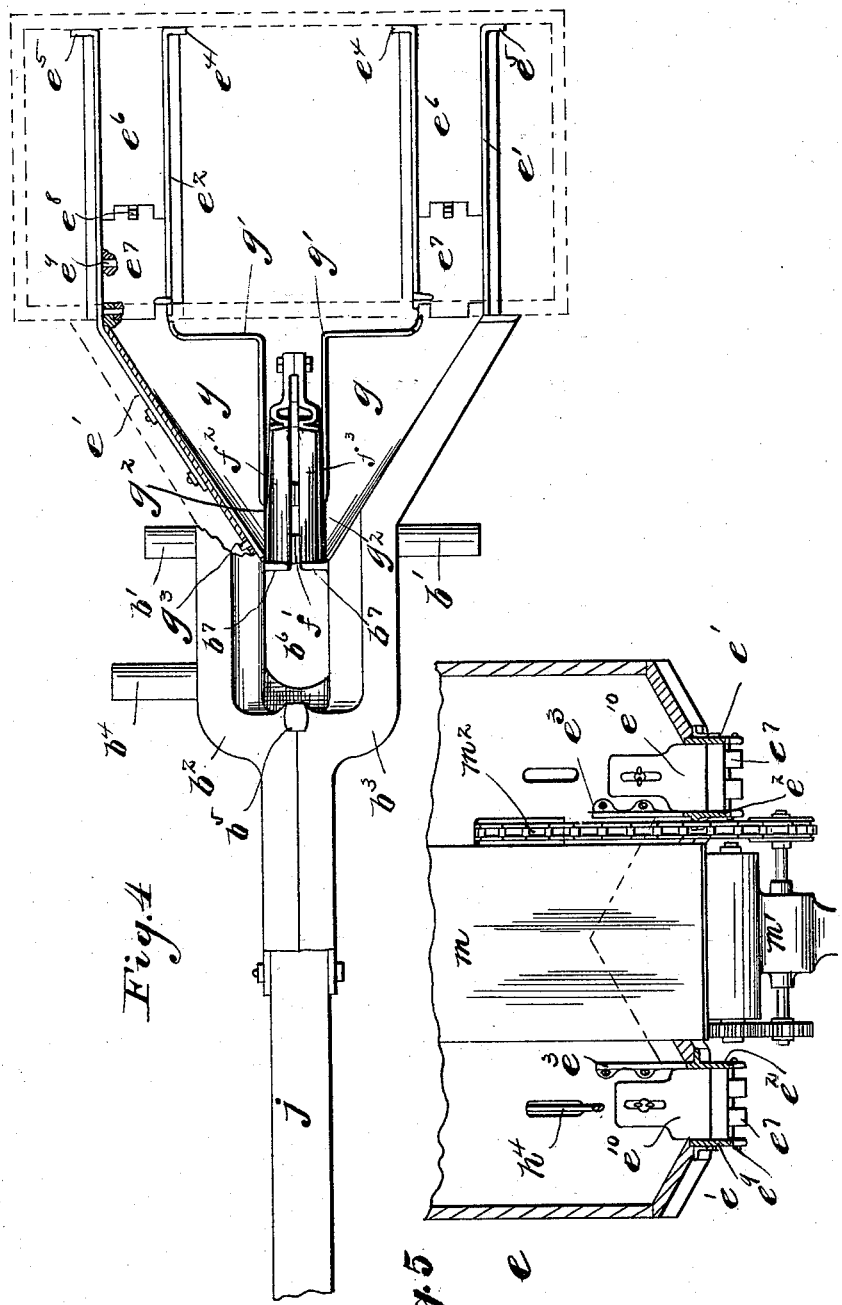

(No Model.) 7 Sheets—Sheet 5.
L. C. EVANS.
POTATO PLANTER.
No. 545,786. Patented Sept. 3, 1895.
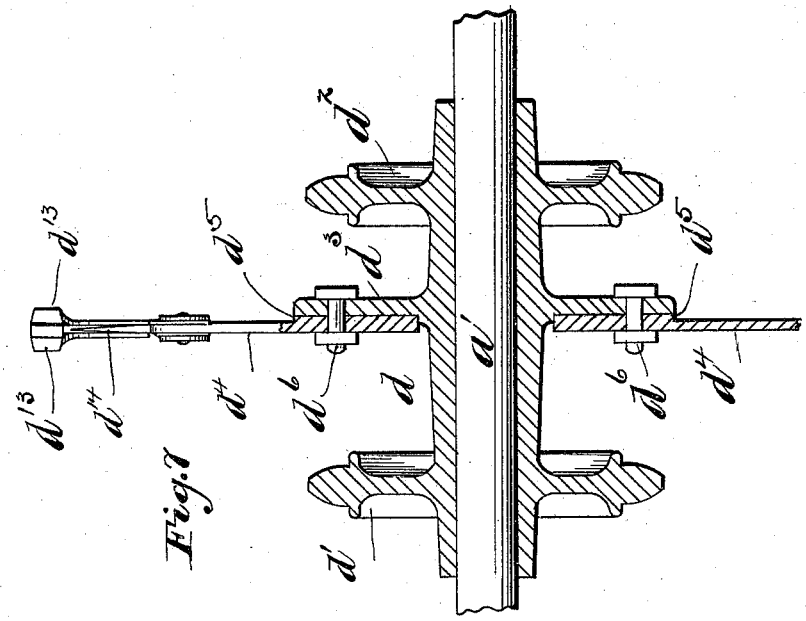
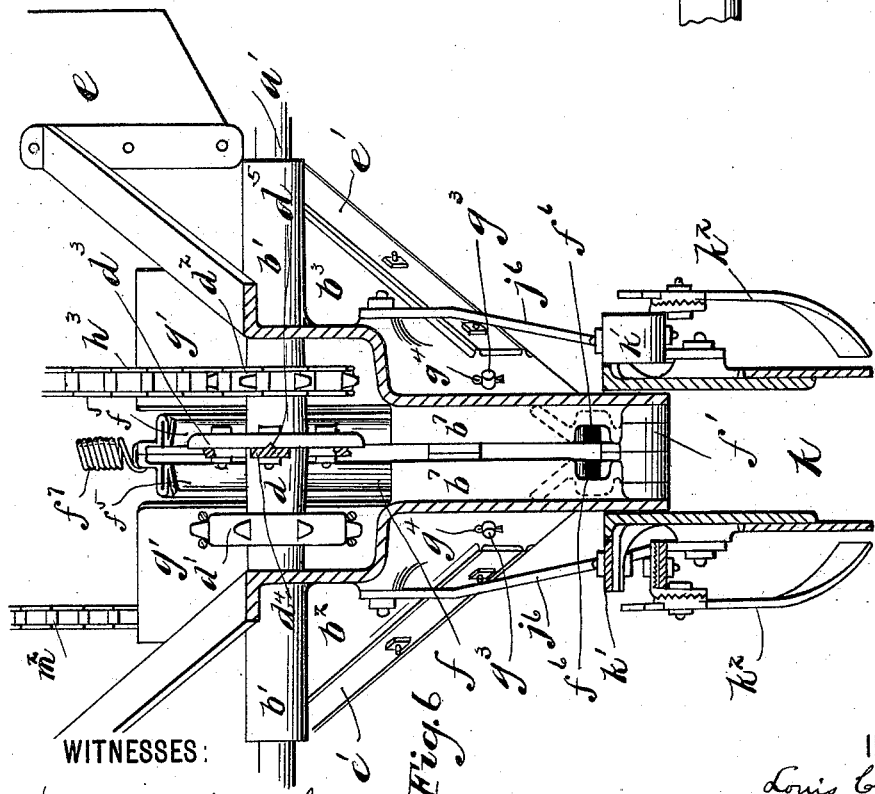
WITNESSES:
Frank M. Burnham
Chas. I. Welsh
INVENTOR
Louis C. Evans
BY
ATTORNEY

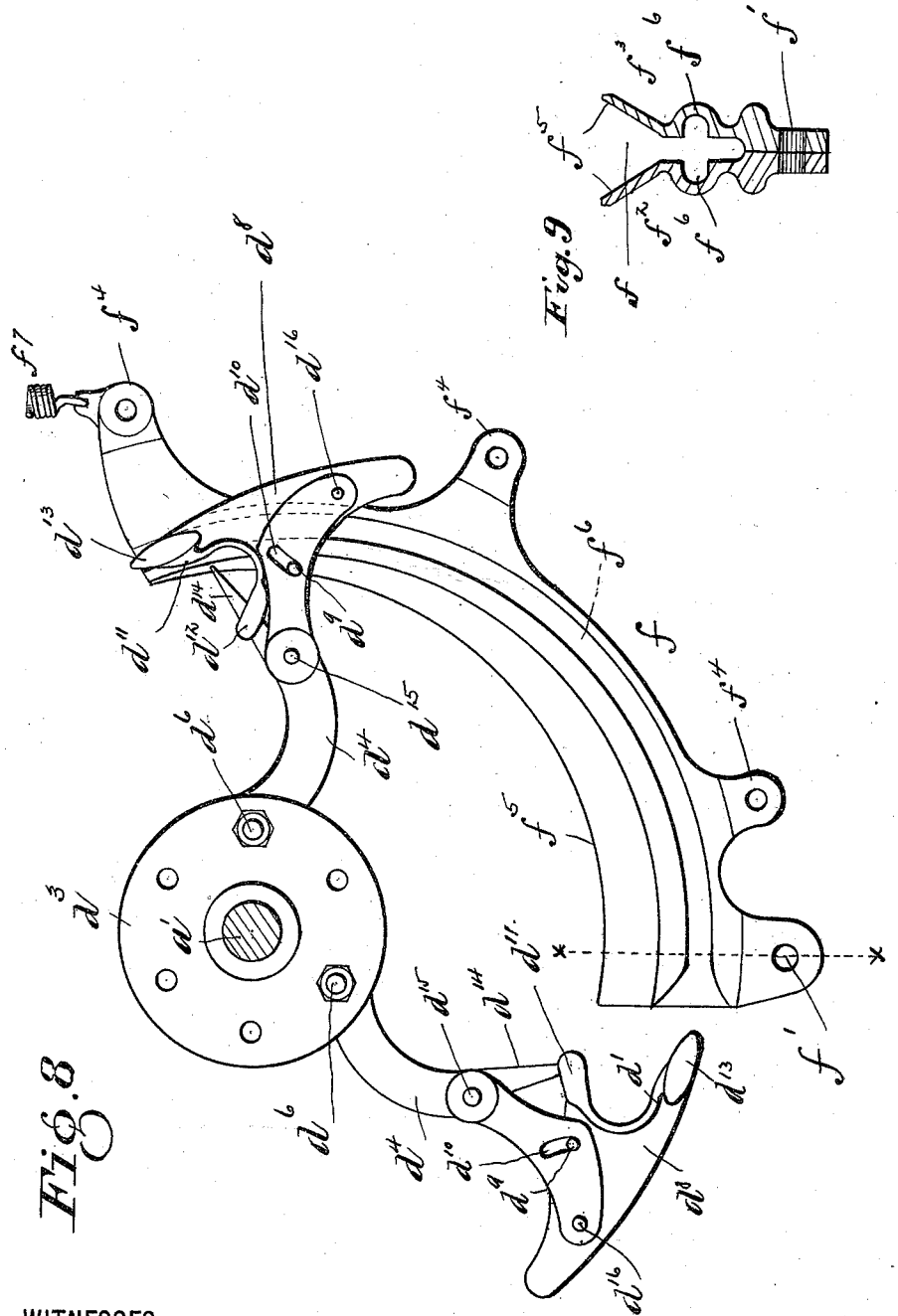

(No Model.) 7 Sheets—Sheet 7.
L. C. EVANS.
POTATO PLANTER.
No. 545,786. Patented Sept. 3, 1895.
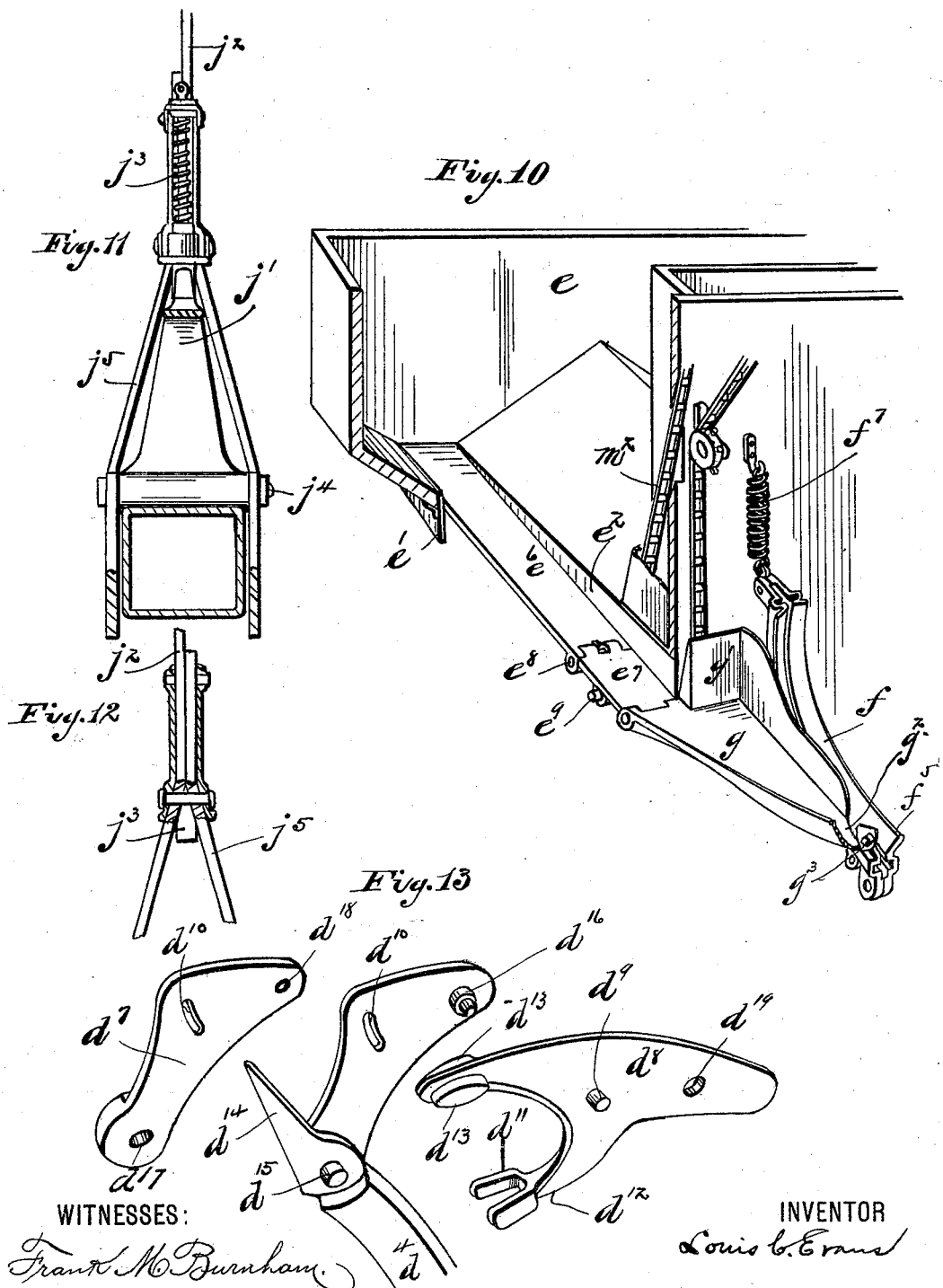
WITNESSES:
Frank M. Burnham
Chas. I. Welch
INVENTOR
Louis C. Evans
BY
[signature]
ATTORNEY

UNITED STATES PATENT OFFICE.

LOUIS C. EVANS, OF SPRINGFIELD, OHIO.

POTATO-PLANTER.

SPECIFICATION forming part of Letters Patent No. 545,786, dated September 3, 1895.

Application filed March 6, 1895. Serial No. 540,723. (No model.)

*To all whom it may concern:*

Be it known that I, LOUIS C. EVANS, a citizen of the United States, residing at Springfield, in the county of Clark and State of Ohio, have invented certain new and useful Improvements in Potato-Planters, of which the following is a specification.

My invention relates to improvements in potato-planters; and it consists in the various constructions and combinations of parts hereinafter described, and set forth in the claims.

The object of my invention is to provide means by which the distance between the hills may be varied at will without the necessity of carrying additional feeding devices or changing the position of those in use.

A further object of my invention is to provide a simple and effective device for feeding the potatoes to the dropping devices and securing the same therein.

A further object of my invention is to provide a simple and effective agitating device by means of which choking of the potatoes in the hopper is obviated.

A further object of my invention is to provide a simple and effective cut-off by which the supply of the potatoes to the dropping devices is regulated as desired.

A further object of my invention is to provide simple and effective mechanism whereby the depth of planting may be varied at will.

A further object of my invention is to simplify and improve on the constructions of potato-planters now in use, and to provide an effective machine which will operate with certainty and be capable of ready adjustment to the different conditions to which it may be subjected in use.

I attain these objects by the constructions shown in the accompanying drawings, in which—

Figure 1:
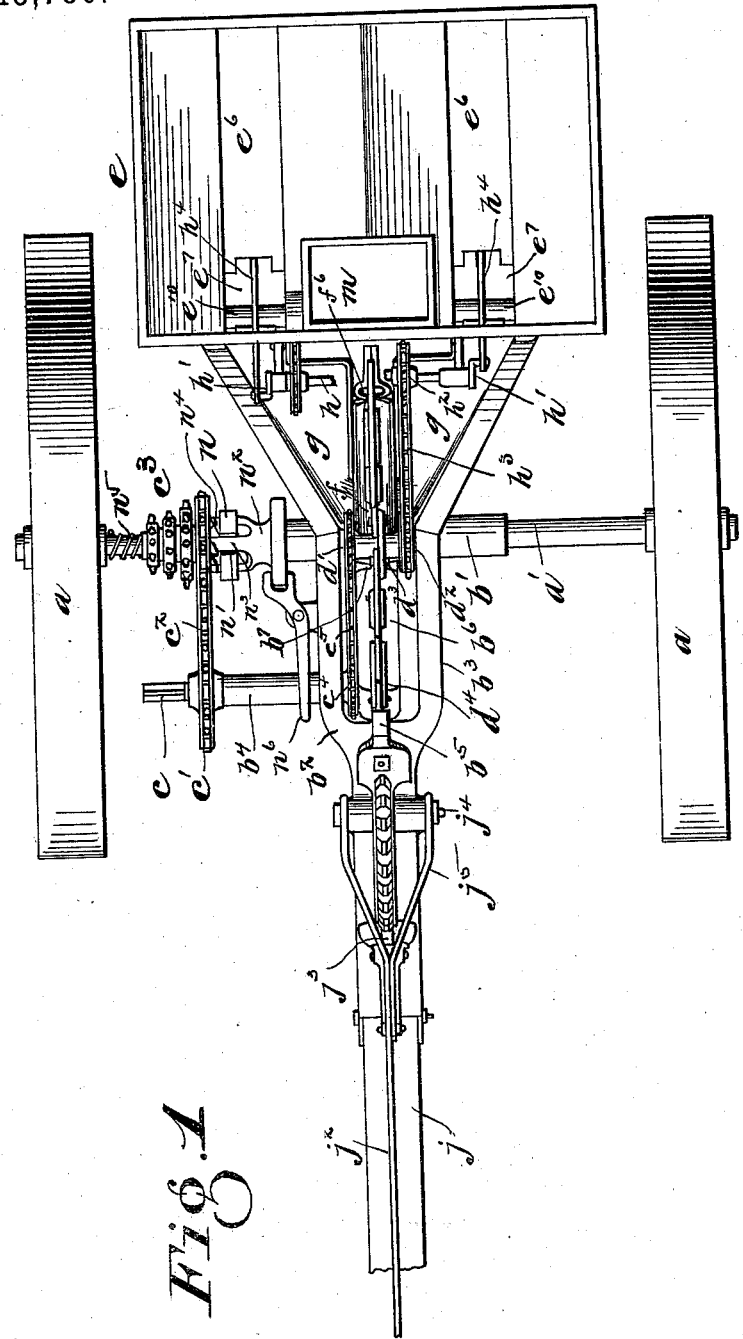
Figure 2:
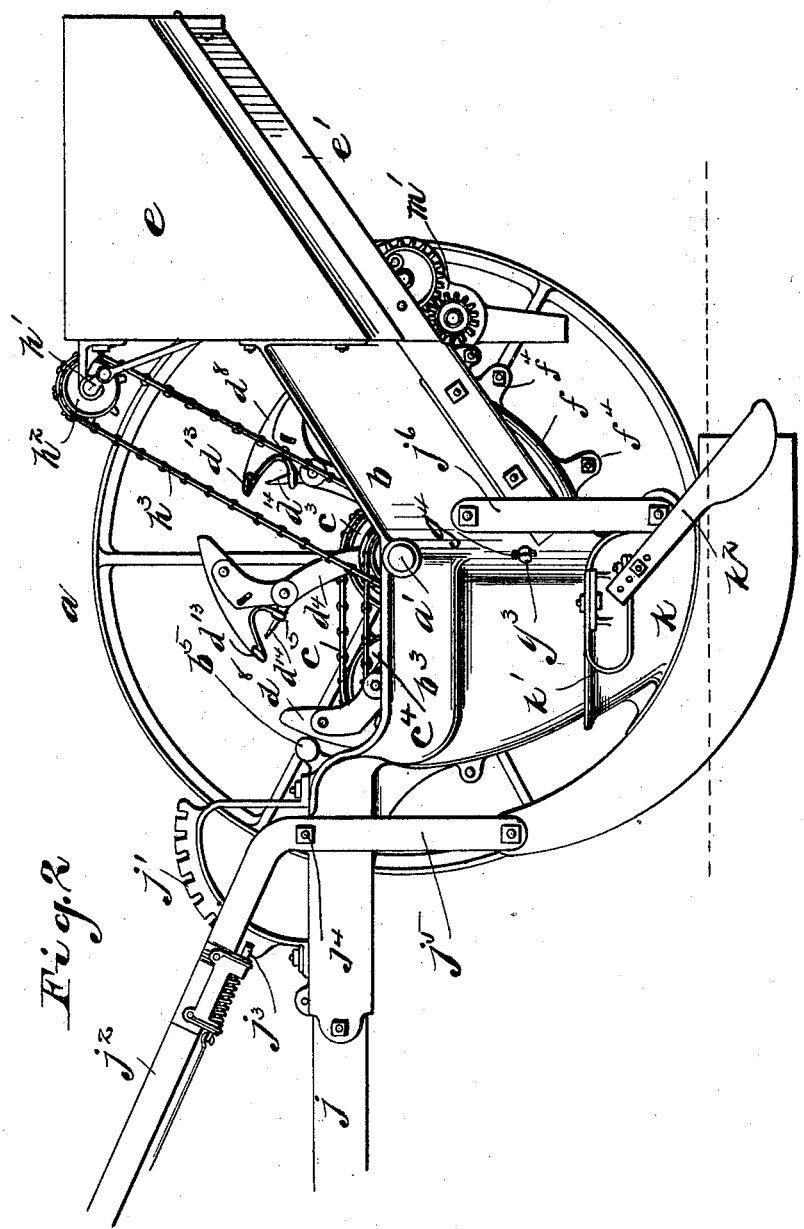
Figure 3:
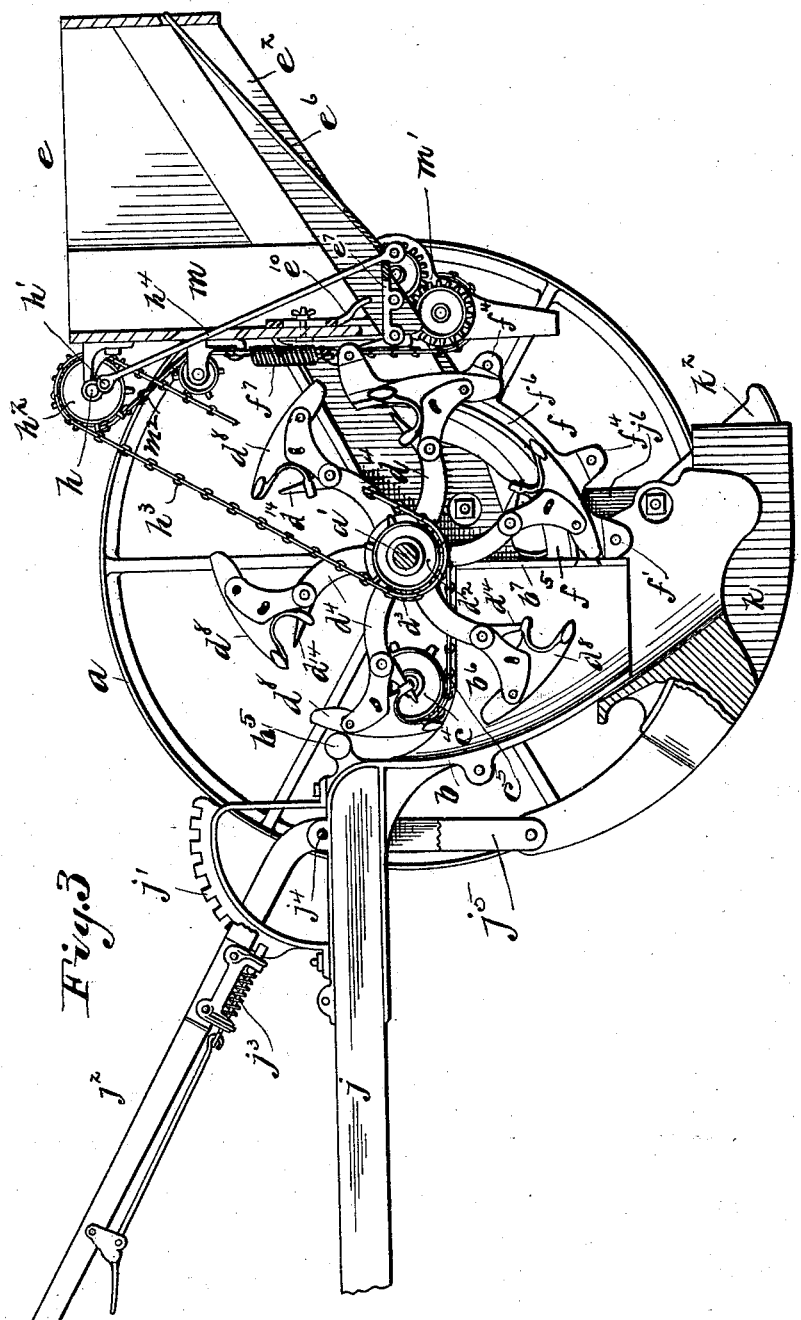

Figure 1 is a plan view of a device embodying my invention. Fig. 2 is a side elevation of the same with one of the driving-wheels removed. Fig. 3 is a sectional elevation of the same, the section being taken through one of the agitators in the hopper and representing one side of the main frame, with the conduit therein removed. Fig. 4 is a plan view of the frame, showing the arrangement of the agitators, conduit, and concave, with the hopper shown in dotted lines and some of the parts broken away and shown in section. Fig. 5 is a vertical sectional view of a portion of the hopper. Fig. 6 is a transverse sectional elevation of a part of the main frame, taken just in front of the main shaft. Fig. 7 is a sectional elevation in detail of the spider carrying the picker-arms. Fig. 8 is a detail view of the picker-arms and the concave, with a part of the concave removed. Fig. 9 is a sectional view of the concave on the line $x\ x$ in Fig. 8. Fig. 10 is a perspective view, partly in section, of a portion of the hopper and the parts of the feeding mechanism connected therewith. Fig. 11 is a sectional view through the tongue, showing a part of the lifting-lever and its connections. Fig. 12 is a detail view, partly in section, of a portion of the same. Fig. 13 is a perspective view of the outer end of the picker-arm with the parts separated and removed.

Like parts are represented by similar letters of reference in the several views.

In the said drawings, $a\ a$ represent the driving and carrying wheels, which are mounted at each end of a main shaft $a'$. This main shaft $a'$ is supported in the main frame $b$ in bearings $b'$, which extend from opposite sides of said frame and are preferably formed integral therewith. The main frame $b$ is preferably cast in two parts $b^2$ and $b^3$, which are joined together in the center of the machine. When the parts $b^2$ and $b^3$ are joined together, the frame constitutes a casing in which the various operating parts are inclosed and by which they are supported. Projecting from one side of the main frame in front of the bearings $b^1$ is a bearing $b^4$, which supports a counter-shaft $c$. This counter-shaft carries on the outside of the frame an adjustable sprocket-wheel $c'$, which is engaged by a driving-chain $c^2$, adapted to be engaged by either one of a series of sprockets $c^3$ of different sizes, which I term the "cone-sprocket wheel," so that by changing the chain from one sprocket-wheel to the other on the cone-sprocket and adjusting the sprocket-wheel $c'$ on the shaft $c$ to correspond thereto, the said shaft $c$ may be driven at different speeds with reference to the main shaft $a'$.

Within the frame $b$ and journaled on the main shaft $a'$ is a hub or spider $d$, which carries at each end sprocket-wheels $d'\ d^2$, and near the middle of its length a web or flange $d^3$. The counter-shaft $c$ is further provided on its inner end and within the frame with a sprocket-wheel $c^4$, and a driving-chain $c^5$ connects said sprocket-wheel with the sprocket-wheel $d'$ on the spider $d$. It will be understood that the main shaft $a'$ turns with the driving-wheels $a$. The spider $d$, however, is loose thereon and may turn at the same speed with said shaft or at a different speed, being driven entirely from the counter-shaft $c$, which is connected to the main shaft by the cone-sprocket, as before described. Means are thus provided by which the speed of the spider $d$ may be varied as desired, for the purpose hereinafter to be explained.

The sides of the main frame $b$, at the rear of the main shaft $a'$, are projected upwardly and backwardly at an angle and are bolted or otherwise secured to the hopper $e$, which is supported on said frame in the manner hereinafter more fully described.

There is pivoted in the main frame at a point below the main shaft $a'$ what I term the "concave" $f$, said concave being pivoted at the point $f'$ and extending for something over a quadrant of a circle around the shaft $a'$. This concave is formed in two parts $f^2$ $f^3$, which are bolted together through the medium of lugs $f^4$, which are extended on the periphery thereof at the back. Each side of the concave is provided with a flaring flange $f^5$, and is further provided with a groove $f^6$ below said flange $f^5$. These flaring flanges $f^5$ are gradually decreased in depth as the concave extends upwardly, so as to lose themselves in the body of the concave in the upper part thereof.

There is connected to the spider $d$ and directly to the flange $d^3$ thereof a series of arms $d^4$. These arms are each preferably provided at the point of connection with a feather $d^5$, which fits in a corresponding groove in the flange $d^3$, so that a single bolt $d^6$ is sufficient to hold said arm in positive relation with the flange. (See Figs. 6 and 7.) The outer ends of the arms $d^4$ are bifurcated, one side of the bifurcated portion being preferably formed in the nature of a removable plate $d^7$, and in the bifurcation thus formed is a pivoted plate $d^8$, having at each side projections $d^9$, which engage in slotted openings $d^{10}$ in the respective sides of the bifurcated portion of said arm. This plate $d^8$ is further provided with extending arms $d^{11}$ $d^{12}$, which project in front of the bifurcated portion of the arm $d^4$. One of these arms $d^{11}$ is provided on each side with cam-lugs $d^{13}$, which, as the spider is revolved, are adapted to engage in the grooves $f^6$ in the concave. The other arm $d^{12}$ is bifurcated and the prongs thereof stand on each side of a spike or impaling-fork $d^{14}$, which projects at an angle from the arm $d^4$ and in line with the arm $d^{11}$ of the swinging plate $d^8$. The arms $d^4$ are preferably formed of malleable iron and have projections $d^{15}$ $d^{16}$ extending laterally therefrom to engage in openings $d^{17}$ $d^{18}$ in the removable plate $d^7$, the projection $d^{16}$ being adapted to form a trunnion on which the swinging plate $d^8$ vibrates, a perforation $d^{19}$ being provided in said plate to fit over said trunnion. The outer end of this trunnion or projection $d^{16}$ is reduced where it passes through the opening $d^{18}$ in the plate $d^7$ to form a shoulder, and when the plate $d^7$ is in place the projections $d^{15}$ $d^{16}$ are riveted down so as to hold the parts together with the swinging plate in the bifurcated portion.

The concave $f$ and the grooves $f^6$ therein are formed on the arc of a circle, but not concentric with the shaft $a'$, the upper end of the concave being drawn inwardly toward the shaft, so that as the spider is revolved with the projections $d^{13}$ in the grooves $f^6$ the swinging plates $d^8$ are turned on their trunnions to cause the arms $d^{11}$ to move toward the spikes or impaling forks $d^{14}$. The upper end of the concave is preferably supported by a spring $f^7$, connected to the upper lug $f^4$ and to a suitable projection on the front of the hopper.

Connected to the rear portion of the main frame and extending backwardly therefrom are supporting-bars $e'$, which extend under the hopper $e$ and assist in supporting the same. These bars $e'$ maintain the same vertical angle with the rear portion of the frame throughout their length, but are bent at a point opposite the front end of the hopper, so as to extend backwardly in straight parallel lines under the hopper. The bottom of the hopper is formed at a corresponding angle and is inclined from the back downwardly to the front. The bars $e'$, which are flat bars, set edgewise, project below the bottom of the hopper, and form one side of a trough or chute in the bottom of the hopper, the other side being formed by a plate or bar $e^2$, which is connected at each end to the front and rear of the hopper, respectively, the front end of said plate or bar being extended upwardly, as shown at $e^3$, and provided with suitable lugs and ears for this purpose, the rear end being turned or flanged, as shown in Fig. 4, as is also the ends of the bars $e'$ to form connecting-ears $e^4$ $e^5$, which are bolted or otherwise secured to the back of the hopper, which is extended downwardly below the bottom thereof for this purpose. These troughs or chutes are formed with vibrating bottoms, which consist of two parts $e^6$ $e^7$ hinged together, as shown at $e^8$. The rear portion $e^6$ rests on a suitable support in the rear of the hopper, and the front portion $e^7$ is pivoted on trunnions $e^9$ in the bars $e'$ and the plates $e^2$, respectively. To the front of each oscillating piece $e^7$ is hinged a conduit $g$, each of which is provided at the rear and inner side with side walls $g'$, which extend downwardly to near the front end of the conduit, at which point said conduit is curved forwardly and laterally to form a chute, (shown at $g^2$,) which discharges into the concave $f$ between the flaring walls or flanges $f^5$ $f^5$. These conduits $g$ are pivoted in the sides of the frame $b$ by trunnions $g^3$, which project laterally therefrom, and extending through the walls of the frame, are held against lateral movement by pins $g^4$, as shown in Fig. 6. The bottom of the hopper, extending in each direction from the bars $e'$ $e^2$, is inclined so that the potatoes placed therein will gravitate into the troughs or chutes between said bars so long as any potatoes remain in the hopper. An opening is formed in the front of the hopper over each oscillating plate $e^7$, forming a continuation of the trough. Each of these openings is adapted to be partially closed by a slide $e^{10}$, which is connected to the front of the hopper and provided with a slotted opening, so as to be adjustable up and down, these slides being preferably curved backwardly so that the bottoms thereof stand approximately over the pivotal center of the oscillating plates $e^7$.

Supported on the front of the hopper is a countershaft $h$, provided at each end with cranks $h'$, and carrying a sprocket-wheel $h^2$, which is connected by a chain $h^3$ to the sprocket-wheel $d^2$ on the spider $d$. The cranks $h'$ are connected by pitman-rods $h^4$ to the oscillating plates $e^7$, preferably at the points where said plates $e^7$ are hinged to the vibrating plates $e^6$. The result of this construction is that at each revolution of the shaft $h$ the plates $e^7$ are oscillated from a substantial horizontal position to an inclined position. The plates $e^6$ and the conduits $g$, which are hinged thereto, are also vibrated so that they alternately stand, first, at an angle to the oscillating plates $e^7$ and, second, substantially in line therewith.

The frame $b$ is preferably extended in front, the parts $b^2$ $b^3$ thereof being channeled so as to inclose the tongue $j$. On the extended portion of the frame and above the tongue $j$ is a quadrant $j'$, about which oscillates a lifting-lever $j^2$, having the usual spring-bolt $j^3$ to engage in said quadrant. This lever $j^2$ is bent outwardly, thence downwardly, to one side of the tongue $j$, as shown in Figs. 2 and 11, and is pivoted at its lower end to the front end of the shoe $k$, the lever being pivoted to the frame by a suitable bolt, as shown at $j^4$. On the opposite side of the tongue $j$ is a similar lever $j^5$, also connected to the front end of the shoe and pivoted on the bolt $j^4$ and bent inwardly and upwardly, so as to form the counterpart of the lever $j^2$, except that it ends immediately above the spring-bolt $j^3$, the casing of the spring-bolt $j^3$ being preferably bifurcated and extended on each side of the parts $j^2$ and $j^5$ and riveted to said parts so as to hold them securely together, with the notched quadrant between the parts and in a position to be engaged by said spring-bolt. The shoe $k$ is extended backwardly under the frame $b$ and is bifurcated, so as to engage the lower end of said frame when in an operative position. Links $j^6$, pivoted to the rear end of the shoe and to a suitable part of the frame $b$, support the rear end of the shoe and permit it to vibrate forwardly and upwardly as the position of the lever $j^2$ is changed. On each side of the shoe $k$ is secured a spring $k'$, to the lower end of which is attached by a universal connection a covering-shovel $k^2$, which extends downwardly and backwardly at each side of said shoe, said shovels being supported wholly on said shoe and moving therewith.

Extending upwardly and rearwardly from the front part of the frame, near the end of the tongue $j$, is a cam projection $b^5$, in line with the vibrating plates $d^8$ in the arms $d^4$, and adapted to contact with the rear ends of said plates as the spider is revolved and restore said plates to their normal position after the same have been operated by the grooves in the concave.

I have shown a fertilizer-hopper $m$, Figs. 2, 3, and 10, having a suitable distributing device $m'$ at the bottom thereof, operated by a sprocket-chain $m^2$ from the counter-shaft $h$, this hopper being preferably made separable from the main hopper, so that it may or may not be used, as desired, the opening through the bottom of the main hopper being adapted to be closed by movable portions in any suitable manner.

To provide for throwing the operating devices in and out of gear with the driving-shaft $a'$, I secure on said shaft a flanged hub $n$, having grooves $n'$ therein, and on one of the bearings $b'$ I journal a clutch-sleeve $n^2$, having fingers $n^3$ which project through the grooves $n'$ in said hub $n$, the ends of said fingers being beveled and adapted to engage with ratchet projections $n^4$ on the side of the cone-sprocket $c^3$. The cone-sprocket $c^3$ is loose on the shaft $a'$ and is held in contact with the hub $n$ by a spring $n^5$, so that when the machine is turned backward the sprocket is permitted to yield away from the ratchet-teeth $n^3$ in the clutch collar or sleeve $n^2$. A shifting-lever $n^6$ is provided by means of which the clutch $n^2$ may be thrown out of or into engagement with the ratchet-teeth $n^4$ on the cone-sprocket $c^3$.

The operation of the device is as follows: The potatoes to be planted, having been previously selected or cut to the size desired, are placed in the hopper $e$ and gravitate into the troughs or chutes between the bars $e'$ and $e^2$. As the machine is drawn forward the arms $d^4$ are operated so as to bring the projections on the swinging plates in the grooves in the concave, the forward end of said grooves being beveled, as shown in Fig. 9, to permit the ready access of the projections therein. As the plates $d^8$ enter the concave the arms $d^{11}$ thereof are moved to the limit of their movement away from the spikes or impaling-forks $d^{14}$, which travel between the flaring sides of the concave. The potatoes carried by the intermittent vibration of the vibrating devices in the hopper fall into said concave immediately in front of said arms, and as said arms are advanced are impaled on the spikes or impaling-forks by the closing in of the plates $d^7$, the forked arm $d^{12}$ of the plate $d^8$ being moved inwardly on said spike, so that the potato is impaled on said spike between the arms $d^{11}$ and $d^{12}$. As the arms move upwardly such potatoes or parts thereof as are not impaled are by the shape of the concave and the conduits discharged back into the conduits and fall into the concave to be engaged by the succeeding arms. As the shaft continues to revolve the rear ends of the swinging plates $d^8$ are brought into contact with the cam-lug $b^5$, returning the plates to their normal positions and moving the forked arms $d^{12}$ outwardly along the spikes or impaling-forks and thus discharging the potatoes thereon, which fall through the bottom of the frame and into the shoe $k$ and the furrow formed thereby.

The discharge of the potatoes from the hopper is accomplished by the vibrations of the plates $e^7$, the vibrators $e^6$, and the conduits $g$, and is regulated by the slides $e^{10}$. As the oscillating plate $e^7$ assumes a horizontal position a pocket is formed in each of the chutes under the hopper and the potatoes are momentarily cut off. As the plate is turned to an inclined position the potatoes are discharged from these pockets into the conduits and from thence into the concave. By having the cut-off slide over the center of oscillation of the plate $e^7$, or approximately so, the opening under said slide remains constant and the mashing of the potatoes is prevented.

The spring $f^7$ connected to the concave permits said concave to yield under an unusual pressure and thus prevents the breakage of the parts in case a hard substance should accidentally find its way into said concave or become engaged by the hinged plates on the picker-arm.

It should be noted that the frame is sufficiently wide at the top and front to include the spider and the sprocket-wheels connected thereto, as well as the driving-chain $c^5$. Immediately below these sprocket-wheels and driving-chain the frame is drawn inwardly to form a chamber $b^6$, through which the picker-arms are revolved and the potatoes discharged. This chamber $b^6$ is separated from the rear portion of the frame and the concave $f$ by laterally-extending wings $b^7$, which are separated at their inner ends to permit the arms to pass through, but prevent the potatoes which are discharged into said concave from the conduits $g$ from falling into the chamber $b^6$.

From the above description it will be seen that I have produced a potato-planter which while simple in its construction is extremely effective in operation. By shifting the sprocket-chain on the cone-shaped pulley I am enabled to change the speed of the spider and the picker-arms and thus vary the dropping of the potatoes, so as to change the distance apart of the hills in which they are planted. By the arrangement of the vibrators in the chutes as described I have provided an automatic cut-off by which the flow of the potatoes from the hopper to the dropping devices may be regulated as desired.

It is obvious that the adjustable slides over the vibrating plates at the front of the hopper may be dispensed with, the oscillating plates $e^7$ being adapted to form a cut-off in connection with the front of the hopper.

It is obvious that the same or substantially the same result could be obtained in feeding the potatoes from the hopper by increasing the width of the vibrating plates in the bottom of the hopper, so that the chutes or troughs would be coextensive with the hopper itself. In fact, they may be of any width by simply changing the size or angle of the inclined portions of the hopper or by dispensing with them entirely. The arrangement which I have shown, however, is the preferable one, as the vibrating plates do, in fact, form the bottom of the hopper, which is contracted to narrow limits, so that only a portion of the potatoes therein need be vibrated to accomplish the feed.

The cranks $h'$, which operate the oscillating plates $e^7$, are preferably arranged on opposite sides of the shaft $h$, (shown in Fig. 1,) so that the feeding devices on each side of the hopper are operated alternately. By this construction not only is the feed more uniform from the hopper to the cut-off, but a more uniform distribution of power is secured, as one plate is being lifted up while the other is going down.

Having thus described my invention, I claim—

1. In a potato planter, a main shaft and driving wheels, picker arms carried on a spider which is loose on said main shaft, a driving connection from said main shaft to a countershaft and from said countershaft to the spider having the picker arms, and means as described for varying the speed between the main shaft and the countershaft, substantially as specified.

2. In a potato planter, the combination with the main shaft, and the driving wheels thereon, picker arms on a hub or spider which is journaled on said shaft, a driving connection from said main shaft to said picker arms, said driving connection having variable parts by which the speed of the picker arms with relation to said main shaft may be varied, substantially as specified.

3. The combination with the main frame, a main driving shaft supported thereon, a countershaft also supported in said main frame, and picker arms on a hub or spider which is journaled on said main shaft and driven from said countershaft, and means, substantially as described, for varying the speed between said main shaft and said picker arms, substantially as specified.

4. A main frame and a main driving shaft journaled therein, driving wheels on said shaft, picker arms on a hub or spider which is also journaled on said shaft and adapted to turn independent thereof, a countershaft journaled in said main frame, a driving connection from said main shaft to said countershaft and from said countershaft to said picker arms, said driving connection including variable speed devices by means of which the speed of said picker arms with relation to said main shaft may be varied, substantially as specified.

5. The combination with a main frame, and a main driving shaft, picker arms on a hub or spider which is journaled thereon, and a countershaft connected to said picker arms, a driving connection from said main shaft to said countershaft consisting essentially of a cone sprocket and driving chain by means of which the speed may be varied, substantially as specified.

6. The combination with a main driving shaft, picker arms on a hub or spider which is journaled loosely thereon, a countershaft geared to said main shaft and also to said picker arms, a cone sprocket forming a part of the gearing between said main shaft and countershaft, a clutch between said main shaft and said cone sprocket, a spring for holding said sprocket in engagement with said clutch, and a shifting lever to disengage said clutch, substantially as specified.

7. In a potato planter, a main frame, picker arms therein, a main shaft on which said picker arms are supported, a concave having cam grooves with which said picker arms engage, and vibrating conduits at each side of said concave, substantially as and for the purpose specified.

8. In a potato planter, and in combination with the dropping devices thereof, a hopper, a trough or chute extending to the front of said hopper at the bottom, and a vibrating plate in said trough or chute and a connection from the driving mechanism to said vibrating plate to cause it to vibrate in said trough or chute, substantially as specified.

9. The combination with a hopper, and a trough or chute in the bottom thereof, an oscillating plate pivoted in said chute and a vibrating plate hinged to said oscillating plate, said oscillating plate being arranged in proximity to the front of the hopper, and a vibrating conduit from said oscillating plate to the dropping devices, substantially as specified.

10. The combination, in a potato planter, of a hopper, a trough in the bottom thereof, an oscillating plate journaled in said trough, said oscillating plate being hinged at one end to a vibrating plate in said hopper and at the other end to a vibrating conduit leading from said hopper, substantially as specified.

11. The combination with a hopper, and an oscillating plate therein, a vibrating plate hinged thereto, and an adjustable slide arranged in proximity to the pivotal center of said oscillating plate, substantially as specified.

12. The combination with a hopper having troughs or chutes in the bottom thereof, oscillating plates arranged in said troughs or chutes with the fronts of said oscillating plates substantially in line with the front of said hopper, vibrating plates hinged to said oscillating plates at the rear, and vibrating conduits hinged to said oscillating plates at the front, and dropping devices with which said conduits operate, substantially as specified.

13. The combination with the picker arms, a concave, a pivoted conduit on each side of said concave, and a hopper having oscillating plates connected to each of said conduits, and vibrating plates connected to said oscillating plates at the opposite ends from said conduits, and a connection from the driving mechanism to said oscillating plates, substantially as specified.

14. In a potato planter, a picker arm having at the outer end a vibrating plate with extending arms, one of which is bifurcated, a spike or impaling fork extending from said picker arms and passing through the bifurcated parts of said plate and in line with the other arm thereof, a concave with which said picker arm operates, said concave being provided with cam grooves, and cam projections on said plates to project into said grooves, substantially as specified.

15. The combination with a main frame having a chamber or conduit in the front thereof, and inwardly projecting wings at the rear of said chamber, a concave extending from said wings upwardly and backwardly, and a vibrating conduit on each side of said concave, and a hopper communicating with said conduits, substantially as specified.

16. The combination with a main frame having a chamber therein, a shoe hinged to said main frame by pivoted links as described, a lever joined to one or more of said pivoted links, and means for holding said lever in different positions of adjustment so as to vary the position of said shoe, substantially as specified.

17. The combination with a main frame having a chamber therein, and flaring sides in the rear, backwardly-extending bars from said frame, and a hopper secured to said frame and partially supported on said bars, side plates in said hopper parallel to said bars, an oscillating plate pivoted between said side plates and extended bars, and a vibrating plate hinged to said oscillating plate, and means for operating said oscillating plate from the driving mechanism of said planter, substantially as specified.

18. The combination with the picker arms, and a driving mechanism, a hopper arranged above said picker arms and having conduits extending thereto, vibrating plates in the bottom of said hopper hinged to said conduits, a countershaft having pitman connections to said vibrating plates, and a connection from said countershaft to the rotating picker arms, substantially as specified.

19. A main frame having a contracted chamber in the front thereof, and inwardly-projecting wings at the rear of said chamber, diverging sides from the wings backwardly, and a hopper in the rear of said frame, a concave pivoted at the bottom to said frame and supported yieldingly at the top, picker arms having movable plates adapted to travel in said concave, conduits on each side of said concave, said conduits being arranged within the diverging sides of the frame and pivoted thereto at or near their lower ends, and vibrating plates in said hopper hinged to said conduits, and means for imparting motion to said vibrating plates, substantially as specified.

20. The combination with a main frame and dropping devices therein, an adjustable shoe supported by pivoted links from said frame, said links in front being extended upwardly and united together to form a lifting lever, a quadrant on said frame, and an engaging device on said lifting lever to engage said quadrant, substantially as specified.

21. In a potato planter, the combination with dropping devices, of a hopper having a chute on each side thereof and vibrating feeding devices therein, and a fertilizer hopper having a distributing device arranged in said hopper between said chutes, substantially as specified.

22. The combination with a hopper, and an oscillating plate therein, a vibrating plate hinged thereto, and a pivoted conduit leading from said hopper, substantially as specified.

23. In a potato planter, the combination with the dropping devices, of a hopper and oscillating plate therein, a vibrating plate hinged to said oscillating plate, and means as described for vibrating said plates as said dropping devices are actuated to cause an automatic cutoff, substantially as specified.

24. In a potato planter, a rotating picker arm having a movable plate and a stationary impaling fork, a concave through which said picker arm revolves, cam grooves in said concave, and cam projections on the movable plate, substantially as specified.

25. The combination with the revolving picker arms, and a main frame in which they are revolved, a concave hinged in said main frame, lateral grooves in said concave, movable parts on said picker arms having projections to engage with said grooves, and a spring connected with the top of said concave, substantially as specified.

26. In a potato planter, the combination with the dropping devices, of a hopper having feeding devices therein, said feeding devices consisting essentially of vibrating plates arranged in the bottom of said hopper on opposite sides thereof, and means as described for operating said feeding devices alternately, substantially as specified.

27. The combination with a hopper, and vibrating plates therein, conduits from the vibrating plates to the dropping devices, and means as described for alternately operating the vibrating plates on opposite sides of said hopper, substantially as specified.

In testimony whereof I have hereunto set my hand this 25th day of Feburary, A. D. 1895.

LOUIS C. EVANS.

Witnesses:
OLIVER H. MILLER,
CHAS. I. WELCH.